UNITED STATES PATENT OFFICE

2,324,284

REACTION PRODUCT OF ALDEHYDES AND BIS-(DIAMINO TRIAZINYL) CYANOALKYLENE DISULPHIDES

Gaetano F. D'Alelio and James W. Underwood, Pittsfield, Mass., assignors to General Electric Company, a corporation of New York No Drawing. Application March 17, 1942, Serial No. 435,040

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a compound corresponding to the following general formula:

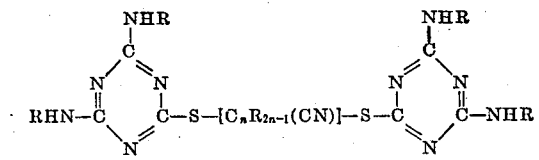

Instead of the symmetrical triazinyl compounds (s-triazinyl compounds) represented by the above formula, corresponding derivatives of the asymmetrical and vicinal triazines may be used.

In the above formula $n$ represents an integer and is at least 1 and not more than 2 and R represents a member of the class consisting of hydrogen and monovalent hydrocarbon and substituted hydrocarbon radicals, more particularly halo-hydrocarbon radicals. Illustrative examples of radicals that R in Formula I may represent are: aliphatic (e. g., methyl, ethyl, propyl, isopropyl, butyl, secondary butyl, isobutyl, butenyl, amyl, isoamyl, hexyl, etc.), including cycloaliphatic (e. g., cyclopentyl, cyclopentenyl, cyclohexyl, cyclohexenyl, cycoheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, iodophenyl, etc. Preferably R in Formula I is hydrogen. However, there also may be used in carrying the present invention into effect compounds such, for instance, as those represented by the general formulas:

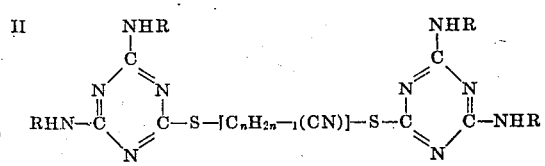

and, more particularly,

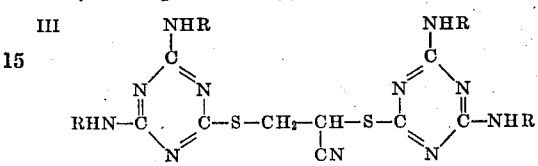

where $n$ and R have the same meanings as above given with reference to Formula I.

The bis-(diamino triazinyl) cyanoalkylene (including cyanoalkylidene) disulphides used in carrying the present invention into effect are more fully described and are specifically claimed in our copending application Serial No. 435,041, filed concurrently herewith and assigned to the same assignee as the present invention. As pointed out in this copending application, such disulphides can be prepared by effecting reaction between a diamino [(—NHR)₂] mercapto symmetrical triazine (s-triazine) and a di-halogenated alkyl cyanide (di-halogenated cyanoalkane) in the presence of a hydrohalide acceptor, e. g., an alkali-metal hydroxide, the reactants being employed in the ratio of two mols of the diamino mercapto s-triazine per mol of the dihalogenated alkyl cyanide.

Specific examples if disulphides that may be used in producing our new condensation products are listed below:

Alpha, beta-bis-(diamino s-triazinyl) cyanoethylene disulphide
Alpha, beta-bis-[4,6-di-(ethylamino) s-triazinyl-2] cyanoethylene disulphide
Alpha, beta-bis-(diamino s-triazinyl) cyanopentylene disulphide
Alpha, beta-bis-(diamino s-triazinyl) cyanohexylene disulphide Alpha, beta-bis-(diamino s-triazinyl) cyanoheptylene disulphide Alpha, beta-bis-(4-amino 6-iodoanilino s-triazinyl-2) cyanopropylene disulphide Alpha-phenyl alpha, beta-bis-(diamino s-triazinyl) cyanoethylene disulphide Beta-tolyl alpha, beta-bis-(diamino s-triazinyl) cyanoethylene disulphide Chlorophenyl bis-(diamino s-triazinyl) cyanomethylene disulphide Alpha, beta-bis-(diamino s-triazinyl) cyanobutylene disulphide Tolyl bis-(diamino s-triazinyl) cyanomethylene disulphide Alpha-(chloroethyl) alpha, beta-bis-(diamino s-triazinyl) cyanoethylene disulphide Alpha, beta-bis-[4,6-di-(allylamino) s-triazinyl-2] cyanoethylene disulphide Alpha-(2-butenylphenyl) alpha, beta-bis-(diamino s-triazinyl) cyanoethylene disulphide Alpha, beta-bis-[4,6-di-(fluoroanilino) s-triazinyl-2] cyanoethylene disulphide Bromophenyl bis-(diamino s-triazinyl) cyanomethylene disulphide Iodotolyl bis-(diamino s-triazinyl) cyanomethylene disulphide Beta, beta-bis-(diamino s-triazinyl) cyanoethylidene disulphide Bis-(4-amino 6-methylamino s-triazinyl-2) cyanomethylene disulphide Bis-[4,6-di-(methylamino) s-triazinyl-2] cyanomethylene disulphide Alpha, alpha-bis-(diamino s-triazinyl) cyanoethylidene disulphide Beta-phenyl alpha, alpha-bis-4-pentylamino 6-ethylamino s-triazinyl-2) cyanoethylidene disulphide Beta, beta-bis-(diamino s-triazinyl) cyanopropylidene disulphide Alpha, beta-bis-(diamino s-triazinyl) cyanopropylene disulphide Alpha-methyl beta, beta-bis-(4-anilino 6-benzylamino s-triazinyl-2) cyanopropylidene disulphide Alpha, beta-dimethyl alpha, beta-bis-(4-xylidino 6-amino s-triazinyl-2) cyanopropylene disulphide Alpha-butyl alpha, beta-bis-(4-amino 6-naphthylamino s-triazinyl-2) cyanoethylene disulphide Alpha-cyclopentyl beta-phenyl alpha, beta-bis-[4,6-di-(chloroanilino) s-triazinyl-2] cyanoethylene disulphide Alpha, beta-di-(chlorophenyl) alpha, beta-bis-(diamino s-triazinyl) cyanoethylene disulphide Beta-benzyl alpha, alpha-bis-(diamino s-triazinyl) cyanopropylidene disulphide Bromotolyl bis-(4-anilino 6-methylamino s-triazinyl-2) cyanomethylene disulphide Phenyl bis-(diamino s-triazinyl) cyanomethylene disulphide Alpha-benzyl alpha, beta-bis-(diamino s-triazinyl) cyanoethylene disulphide Alpha, beta-dimethyl alpha, beta-bis-(diamino s-triazinyl) cyanoethylene disulphide Alpha, beta-bis-(4-amino 6-methylamino s-triazinyl-2) cyanoethylene disulphide Alpha, beta-diethyl alpha, beta-bis-(4-iodoanilino 6-toluido s-triazinyl-2) cyanoethylene disulphide Alpha-methyl alpha, beta-bis-(4-benzylamino 6-naphthylamino s-triazinyl-2) cyanoethylene disulphide Additional examples of disulphides that may be employed in producing the new condensation products of the present invention are given in our above-identified copending application Serial No. 435,041.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a bis-(diamino triazinyl) cyanoalkylene (including cyanoalkylidene) disulphide. The cured resins are outstanding in their resistance to water and organic solvents. Surprisingly, too, the gloss and general appearance of molded articles made from molding compounds containing these new resins in heat-convertible state are much superior to articles similarly molded from molding compositions containing resins produced by reaction of an aldehyde with other amino triazinyl thio compounds such, for example, as thioammeline, bisthioammeline polyalkylene ethers, hydroxyaliphatic thioammoline ethers, etc. Other properties, including resistance to abrasion and heat and curing characteristics, of our new resinous materials also are better than the prior resinous reaction products of an aldehyde and an amino triazinyl thio compound. These improved properties make the products of the present invention suitable for use in fields of utility, for instance, in electrically insulating applications, for which resinous materials of lesser resistance to heat, water, abrasion and organic solvents would be wholly unsuited.

It has been known heretofore that resinous materials can be prepared by reaction of an aldehyde with certain amino triazinyl thio compounds, specifically thioammeline, bisthioammeline polyalkylene ethers and hydroxyaliphatic thioammeline ethers. While such resins are suitable for numerous industrial applications, they are not entirely satisfactory for some uses where optimum heat-, water- and abrasion-resistance are required. Furthermore, in some cases their curing characteristics are inadequate for the high-speed molding technique required for economical molding operations. These and other production difficulties and deficiencies in useful properties of the resin are obviated by creating a synthetic composition from an aldehyde and a bis-(diamino triazinyl) cyanoalkylene (including cyanoalkylidene) disulphide corresponding to Formula I.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulphuric, phosphoric, acetic, lactic, acrylic, malonic, etc., or acid salts such as sodium acid sulphate, monosodium phosphate, monosodium phthalate, etc. Mixtures of acids, of acid salts or of acids and of acid salts may be employed if desired.

The reaction between the aldehyde, e. g., formaldehyde, and the bis-(diamino triazinyl) cyanoalkylene disulphide may be carried out in the presence of solvents or diluents, fillers, other natural or synthetic resinous bodies, or while admixed with other materials that also can react with the aldehydic material or with the disulphide, e. g., ketones, urea ($NH_2CONH_2$), thiourea, selenourea, iminourea (guanidine), substituted ureas, thioureas, selenoureas and iminoureas, numerous examples of which are given in various copending applications of one of us, for instance in D'Alelio copending application Serial No. 363,307, filed October 28, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminodiazines; aminotriazines other than the bis-(diamino triazinyl) cyanoalkylene disulphides, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned in D'Alelio Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.; and the like.

The modifying reactants may be incorporated with the cyanoalkylene disulphide and the aldehyde by mixing all the reactants and effecting condensation therebetween or by various permutations of reactants as described, for example, in D'Alelio and Holmes Patent No. 2,263,289 with particular reference to reactions involving a non-nitrated urea, an aliphatic aldehyde and a nitrated urea, specifically nitrourea (page 2, column 1, lines 71–75, column 2, lines 1–22). For instance, we may form a partial condensation product of ingredients comprising (1) urea or melamine or urea and melamine, (2) a disulphide of the kind herein described, for example bis-(diamino s-triazinyl) cyanomethylene disulphide, a bis-(diamino s-triazinyl) cyanoethylene disulphide, more particularly alpha, beta-bis-(diamino s-triazinyl) cyanoethylene disulphide, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, etc. Thereafter we may effect reaction between this partial condensation product and, for example, a curing reactant, specifically a chlorinated acetamide, to obtain a heat-curable composition. The curing reactant accelerates the cure of the resin and improves its resistance to water. Direct or active curing catalysts and latent curing catalysts also accelerate the conversion of the heat-convertible or potentially heat-convertible resin to a cured state and improve its water resistance. The curing agent may be omitted, if desired, when rapidity of cure of the thermosetting resin and the water resistance of the cured resin are of secondary consideration.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have a high dielectric strength and excellent resistance to arcing. They have an excellent surface finish and exceptionally high resistance to water, organic solvents and abrasion.

The liquid intermediate condensation products of this invention may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect the following illustrative examples thereof are given. All parts are by weight.

*Example 1*

| | Parts |
|---|---|
| Alpha, beta-bis-(diamino s-triazinyl) cyanoethylene disulphide | 33.7 |
| Aqueous formaldehyde (approx. 37.1% HCHO) | 40.5 |
| Aqueous ammonia (approx. 28% $NH_3$) | 3.4 |
| Sodium hydroxide in 2 parts water | 0.04 |
| Chloroacetamide (monochloroacetamide) | 0.4 |

All of the above components with the exception of the chloroacetamide were heated together under reflux at the boiling temperature of the mass for 16 minutes. The chloroacetamide was now added and refluxing was continued for an additional 4 minutes. The resulting resinous syrup had a pH of 8.9. This syrup was mixed with 26 parts alpha cellulose in flock form and 0.2 part of a mold lubricant, specifically zinc stearate, to form a molding (moldable) composition. The wet molding compound was dried at 60° C. until sufficient moisture had been removed to provide a material that could be molded satisfactorily. A well-cured molded article having a well-knit and homogeneous structure was obtained by molding a sample of the dried and ground molding compound for 5 minutes at 135° C. under a pressure of 2,000 pounds per square inch.

Instead of using chloroacetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride aminoacetonitrile hydrochloride, ethylene diamine monohydrochloride, diethanolamine hydrochloride, nitrourea, chloroacetyl urea, chloroacetone, glycine, sulphamic acid, citric diamide, phenacyl chloride, etc.). Other examples of active and latent curing catalysts and of curing reactants that may be employed to accelerate or to effect the curing of the thermosetting or potentially thermosetting resins of this and other examples are given in various D'Alelio copending applications, for instance, in copending applications Serial No. 346,962, filed July 23, 1940, and Serial No. 354,395, filed August 27, 1940, both of which applications are assigned to the same assignee as the present invention.

*Example 2*

| | Parts |
|---|---|
| Alpha, beta-bis-(diamino s-triazinyl) cyanoethylene disulphide | 10.1 |
| Urea | 7.2 |
| Aqueous formaldehyde (approx. 37.1%) | 60.5 |
| Aqueous ammonia (approx. 28% NH₃) | 1.7 |
| Chloroacetamide | 0.4 |

All of the above components with the exception of the chloroacetamide were heated together under reflux at boiling temperature for 15 minutes. The chloroacetamide was now added and refluxing was continued for an additional 5 minutes to cause the chloroacetamide to intercondense with the cyanoethylene disulphide-urea-formaldehyde partial condensation product. The resulting resinous syrup, which had a pH of 8.52, was mixed with 26.6 parts alpha cellulose and 0.2 part zinc stearate to form a molding compound. The wet compound was dried at 60° C. as described under Example 1. A well-cured molded product was obtained by molding a sample of the dried and ground molding compound under the same time, temperature and pressure conditions set forth under Example 1. The molding compound showed good plastic flow during molding.

*Example 3*

| | Parts |
|---|---|
| Alpha, beta-bis-(diamino s-triazinyl) cyanoethylene disulphide | 16.8 |
| Para-amino benzene sulphonamide | 8.6 |
| Aqueous formaldehyde (approx. 37.1% HCHO) | 40.5 |
| Sodium hydroxide in 1.5 parts water | 0.03 |
| Chloroacetamide | 0.3 |

A resinous syrup was produced by refluxing all of the above components with the exception of the chloroacetamide for 12 minutes, after which the chloroacetamide was added and refluxing was continued for an additional 1 minute. This syrup had a pH of 8.87. A molding compound was made therefrom by mixing it with 22.9 parts alpha cellulose and 0.2 part zinc stearate. The wet compound was dried at 60° C. as described under Example 1. A sample of the dried and ground molding compound was molded into the form of a disk, using a molding time of 3 minutes, a molding temperature of 135° C. and a molding pressure of 2,000 pounds per square inch. The molded disk was well cured throughout and showed excellent cohesive characteristics. The molding compound showed very good plastic flow during molding.

*Example 4*

| | Parts |
|---|---|
| Alpha, beta-bis-(diamino s-triazinyl) cyanoethylene disulphide | 33.7 |
| Dimethylol urea (commercial grade containing approx. 11% by weight of water) | 53.8 |
| Aqueous ammonia (approx. 28% NH₃) | 3.4 |
| Sodium hydroxide in 2.5 parts water | 0.05 |
| Water | 100.0 |
| Chloroacetamide | 0.5 |

All of the above ingredients with the exception of the chloroacetamide were heated together under reflux at boiling temperature for 13 minutes. The chloroacetamide was now added and refluxing was continued for an additional 4 minutes. The resinous syrup produced in this manner had a pH of 8.75. This syrup was mixed with 30.5 parts alpha cellulose and 0.2 part zinc stearate to form a molding compound. The wet compound was dried as described under the previous examples. A well-cured molded article was produced by molding a sample of the dried and ground molding compound as described under Example 3. The molding compound showed good flow characteristics during molding as evidenced by the amount of flash on the molded piece.

*Example 5*

| | Parts |
|---|---|
| Alpha, beta-bis-(diamino s-triazinyl) cyanoethylene disulphide | 25.2 |
| Acrolein | 21.0 |
| Sodium hydroxide in 1 part water | 0.02 | were heated together under reflux at boiling temperature for several minutes, at the end of which period of time a resinous material separated from the reaction mass. This resinous material was thermosetting, as shown by the fact that it cured rapidly to an insoluble and infusible state when a small sample of it was heated on a 140° C. hotplate. The addition of chloroacetamide and other curing agents such as mentioned under Example 1, followed by heating on a 140° C. hotplate, accelerates the conversion of the resin to an insoluble state. The resinous material of this example, with or without various curing agents, may be used in the production of molding compounds.

*Example 6*

| | Parts |
|---|---|
| Alpha, beta-bis-(diamino s-triazinyl) cyanoethylene disulphide | 10.0 |
| Aqueous formaldehyde (approx. 37.1% HCHO) | 50.0 |
| Butyl alcohol | 50.0 |
| Aqueous solution of sodium hydroxide (0.52 N) | 0.04 |

All of the above ingredients with the exception of the butyl alcohol were heated together under reflux for 20 minutes, yielding a clear solution. The butyl alcohol was now added and refluxing was continued for several minutes more. The resulting resinous syrup was dehydrated by heating it on a steam plate. The dehydrated resin was found to be soluble in ethyl alcohol, butyl alcohol and ethylene glycol. The solubility and film-forming characteristics of the resinous composition of this example make it especially suitable for use in the production of spirit and baking varnishes. It may be used as a modifier of varnishes of the aminoplast and alkyd-resin types.

*Example 7*

| | Parts |
|---|---|
| Alpha, beta-bis-(diamino s-triazinyl) cyanoethylene disulphide | 25.2 |
| Acetamide | 4.4 |
| Aqueous formaldehyde (approx. 37.1% HCHO) | 48.6 |
| Sodium hydroxide in 2 parts water | 0.04 | were heated together under reflux at boiling temperature for 15 minutes. The resulting resinous syrup was potentially heat-curable as shown by the fact that when chloroacetamide, sodium chloroacetate and other curing agents such as mentioned under Example 1 were incorporated into small samples of the resin, followed by heating on a 140° C. hotplate, the individual sample cured rapidly to an insoluble and infusible state. The resinous composition of this example is particularly suitable for use in the preparation of thin, molded plastic materials, for example flexible covers and novelty articles that are made in thin cross-sections.

*Example 8*

| | Parts |
|---|---|
| Alpha, beta-bis-(diamino s-triazinyl) cyanoethylene disulphide | 25.2 |
| Diethyl malonate | 12.0 |
| Aqueous formaldehyde (approx. 37.1% HCHO) | 48.6 |
| Sodium hydroxide in 2 parts water | 0.04 | were heated together under reflux at boiling temperature for 15 minutes. A resinous layer separated from the reaction mass upon cooling the mass to room temperature. The resinous layer was tested for its curing characteristics by treating small samples of it with various curing agents and heating the resulting mixture on a 140° C. hotplate. Sulphamic acid, phthalic acid and citric acid were used as curing agents. In all cases these agents caused the resinous material to convert rapidly at 140° C. to a cured or insoluble and infusible state. Instead of these curing agents, other curing agents such as mentioned under Example 1 may be employed.

*Example 9*

| | Parts |
|---|---|
| Alpha, beta-bis-(diamino s-triazinyl) cyanoethylene disulphide | 25.2 |
| Glycerine | 6.9 |
| Aqueous formaldehyde (approx. 37.1% HCHO) | 48.6 |
| Sodium hydroxide in 2 parts water | 0.04 | were heated together under reflux at boiling temperature for 15 minutes. The resulting resinous syrup was tested for its curing characteristics as described under Example 8. The use of chloroacetamide as a curing agent yielded a heat-curable resinous material that cured less rapidly to an insoluble and infusible state than the resinous materials into which had been incorporated a small amount of sulphamic acid, citric acid and hydrochloric acid as a curing agent. Samples of the dehydrated resin, both with and without hydrochloric acid as a curing agent, were applied to glass plates and the coated plates were baked at 60° C. for several hours. The baked films produced in this manner were transparent and adhered tightly to the surface of the glass. The resinous material of this example is particularly suitable for use in the preparation of coating compositions.

*Example 10*

| | Parts |
|---|---|
| Alpha, beta-bis-(diamino s-triazinyl) cyanoethylene disulphide | 25.2 |
| Polyvinyl alcohol | 3.4 |
| Aqueous formaldehyde (approx. 37.1% HCHO) | 48.6 |
| Sodium hydroxide in 2 parts water | 0.04 | were heated together under reflux at boiling temperature for 15 minutes. When a sample of the resulting resinous syrup was heated on a 140° C. hotplate it bodied to an elastic mass having good adhesive and cohesive characteristics. This resinous material is potentially heat-curable as shown by the fact that when citric acid, hydrochloric acid and other curing agents such as mentioned under Example 1 were incorporated either into the resinous syrup or into the dehydrated resin, followed by heating on a 140° C. hotplate, the resin cured to an insoluble and infusible state. The resinous material of this example is especially suitable for use in the preparation of baking varnishes. Films formed on glass plates by baking the resin-coated plate at 60° C. for several hours were transparent and hard, and adhered tightly to the glass surface. Similar results were obtained when resins were used in which a small amount of a curing agent, specifically hydrochloric acid, had been incorporated prior to the application of the resin to the glass plate.

*Example 11*

A phenolic resin syrup was prepared by heating the following components for 4 hours at 65° C.:

| | Parts |
|---|---|
| Phenol | 90.0 |
| Aqueous formaldehyde (approx. 37.1% HCHO) | 195.0 |
| Potassium carbonate | 2.85 |

The phenol-formaldehyde liquid partial condensation product prepared in this manner is described in the following formula as "syrupy phenolic resin":

| | Parts |
|---|---|
| Syrupy phenolic resin | 75.6 |
| Alpha, beta-bis-(diamino s-triazinyl) cyanoethylene disulphide | 2.52 |

These components were heated together under reflux at boiling temperature for 1 hour to cause the disulphide to intercondense with the phenol-formaldehyde partial condensation product. The resulting resinous syrup was potentially heat-curable as shown by the fact that when sulphamic acid, citric acid, phthalic acid and other curing agents such as mentioned under Example 1 were incorporated into the resin, followed by heating on a 140° C. hotplate, the resin cured rapidly to an infusible mass.

It will be understood, of course, by those skilled in the art that the reaction between the aldehyde and the disulphide may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples at boiling temperature under reflux as mentioned in the various examples, the reaction between the components may be carried out at temperatures ranging from room temperature up to the boiling temperature of the mass, using longer reaction periods and, in some cases, stronger catalysts and higher catalyst concentrations at the lower temperatures.

It also will be understood by those skilled in the art that our invention is not limited to condensation products obtained by reaction of ingredients comprising an aldehyde and the specific bis-(diamino triazinyl) cyanoalkylene disulphide named in the above illustrative examples. Thus, instead of alpha, beta-bis-(diamino s-triazinyl) cyanoethylene disulphide we may use, for example, alpha, alpha-bis-(diamino s-triazinyl) cyanoethylidene disulphide, beta, beta-bis-(diamino s-triazinyl) cyanoethylidene disulphide or any other disulphide of the kind embraced by Formula I, numerous examples of which have been given above and in our copending application Serial No. 435,041.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, glycollic aldehyde, glyceraldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, and of substituted ureas, selenoureas, thioureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, succinic, citric, phthalic, etc.; mono- and poly-(N-carbinol) derivatives of the aminotriazoles, mono- and poly-(N-carbinol) derivatives of the aminodiazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the disulphide may be varied over a wide range. Ordinarily these reactants are employed in an amount corresponding to at least one mol of the aldehyde, specifically formaldehyde, for each mol of the disulphide. Thus, we may use, for example, from 1 to 12 or 15 or more mols of an aldehyde for each mol of the disulphide. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 25 or 30 or more mols of such alkylol derivatives for each mol of the disulphide.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, butyl, isobutyl hexyl, etc., alcohols; polyhydric alcohols such as diethylene glycol, triethylene glycol, pentaerythritol, etc.; amides such as formamide, stearamide, acrylamide, benzamide, benzene sulphonamides, toluene sulphonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio copending applications Serial No. 289,273, filed August 9, 1939, now Patent No. 2,281,559, issued May 5, 1942, and Serial No. 400,649, filed July 1, 1941, now Patent No. 2,294,873, issued September 1, 1942; and others.

The modifying bodies also may take the form of high molecular weight bodies with or without resinous characteristics, for example hydrolyzed wood products, formalized cellulose derivatives, lignin, protein-aldehyde condensation products, aminodiazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl ethers, polyvinyl esters, e. g., polyvinyl acetate, polyvinyl butyrate, etc.

Instead of effecting reaction between a triazinyl compound of the kind herein described and an aldehyde, e. g., formaldehyde, we may cause an aldehyde to condense with a salt (organic or inorganic) of the triazinyl compound or with a mixture of the triazinyl compound and a salt thereof. Examples of organic and inorganic acids that may be used in the preparation of such salts are hydrochloric, sulphuric, phosphoric, boric, acetic, chloroacetic, propionic, butyric, valeric, acrylic, oxalic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers, curing agents and various fillers (e. g., wood flour, glass fibers, asbestos, including defibrated asbestos, mineral wool, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be employed as impregnants for electrical coils and for other electrically insulating applications.

What we claim as new and desire to secure by Letters Patent of the United States is:

1. A composition of matter comprising the reaction product of ingredients comprising (1) an aldehyde and (2) a compound corresponding to the general formula

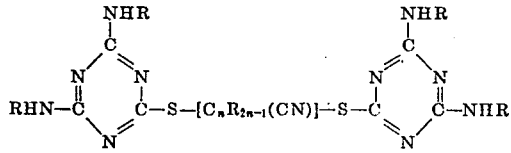

where $n$ represents an integer and is at least 1 and not more than 2, and R represents a member of the class consisting of hydrogen and monovalent hydrocarbon and halohydrocarbon radicals.

2. A composition as in claim 1 wherein the reaction product is the product obtained by effecting initial reaction between the specified components under alkaline conditions.

3. A composition as in claim 1 wherein the aldehyde is formaldehyde.

4. A composition as in claim 1 wherein R in the formula of the compound of (2) represents hydrogen.

5. A composition of matter comprising the reaction product of ingredients comprising (1) an aldehyde and (2) a compound corresponding to the general formula

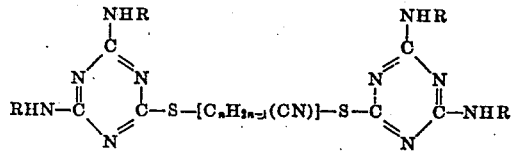

where $n$ represents an integer and is at least 1 and not more than 2, and R represents a member of the class consisting of hydrogen and monovalent hydrocarbon and halohydrocarbon radicals.

6. A heat-curable resinous composition comprising a heat-convertible condensation product of ingredients comprising (1) formaldehyde and (2) a compound corresponding to the general formula

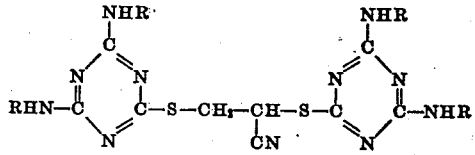

where R represents a member of the class consisting of hydrogen and monovalent hydrocarbon and halohydrocarbon radicals.

7. A product comprising the cured resinous composition of claim 6.

8. A resinous composition comprising the prodduct of reaction of ingredients comprising an aldehyde and bis-(diamino s-triazinyl) cyanomethylene disulphide.

9. A composition comprising the resinous condensation product of ingredients comprising an aldehyde and a bis-(diamino s-triazinyl) cyanoethylene disulphide.

10. A resinous composition comprising the product of reaction of ingredients comprising formaldehyde and alpha, beta-bis-(diamino s-triazinyl) cyanoethylene disulphide.

11. A composition comprising the product of reaction of ingredients comprising a urea, an aldehyde and a compound corresponding to the general formula of the compound of (2) of claim 1.

12. A composition comprising the resinous product of reaction of ingredients comprising urea, an aldehyde and a compound corresponding to the general formula of the compound of (2) of claim 5.

13. A composition comprising the product of reaction of ingredients comprising a phenol, an aldehyde and a compound corresponding to the general formula of the compound of (2) of claim 1.

14. A resinous composition comprising the product of reaction of ingredients comprising melamine, an aldehyde and a compound corresponding to the general formula of the compound of (2) of claim 1.

15. A heat-curable composition comprising the heat-convertible resinous reaction product of (a) a partial condensation product of ingredients comprising formaldehyde and a compound corresponding to the general formula of the compound of (2) of claim 1, and (b) a curing reactant.

16. A composition comprising the resinous reaction product of (a) a partial condensation product of ingredients comprising formaldehyde and a compound corresponding to the general formula of the compound of (2) of claim 5, and (b) a chlorinated acetamide.

17. A composition comprising the product of reaction of ingredients comprising urea, formaldehyde and alpha, beta-bis-(diamino s-triazinyl) cyanoethylene disulphide.

18. A resinous composition comprising the product of reaction of ingredients comprising dimethylol urea and alpha, beta-bis-(diamino s-triazinyl) cyanoethylene disulphide.

19. A composition comprising the resinous product of reaction of (1) a partial condensation product of ingredients comprising urea, formaldehyde and alpha, beta-bis-(diamino s-triazinyl) cyanoethylene disulphide, and (2) a chlorinated acetamide.

20. The method of preparing new condensation products which comprises effecting reaction between ingredients comprising an aldehyde and a compound corresponding to the general formula

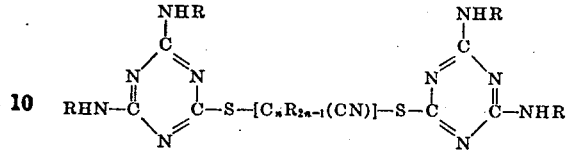

where $n$ represents an integer and is at least 1 and not more than 2, and R represents a member of the class consisting of hydrogen and monovalent hydrocarbon and halohydrocarbon radicals.

GAETANO F. D'ALELIO.
JAMES W. UNDERWOOD.

CERTIFICATE OF CORRECTION.

Patent No. 2,324,284.  July 13, 1943.

GAETANO F. D'ALELIO, ET AL.

It is hereby certified that error appears in the printed specification of the above numbered patent requiring correction as follows: Page 1, first column, line 34, for "cycoheptyl" read --cycloheptyl--; and second column, line 39, for "if" read --of--; line 49, after "s-triazinyl" insert a closing parenthesis; page 2, first column, line 35, after "bis-" and before "4-" insert an opening parenthesis; and second column, line 25, for "thioammoline" read --thioammeline--; page 3, first column, line 35, for "363,307" read --363,037--; page 4, first column, line 32, after "ride" insert a comma; page 7, first column, line 35, for "impregated" read --impregnated--; and that the said Letters Patent should be read with this correction therein that the same may conform to the record of the case in the Patent Office.

Signed and sealed this 7th day of September, A. D. 1943.

(Seal)

Henry Van Arsdale,
Acting Commissioner of Patents.